D. G. EDWARDS.
POWDER DISTRIBUTER.
APPLICATION FILED FEB. 11, 1920.

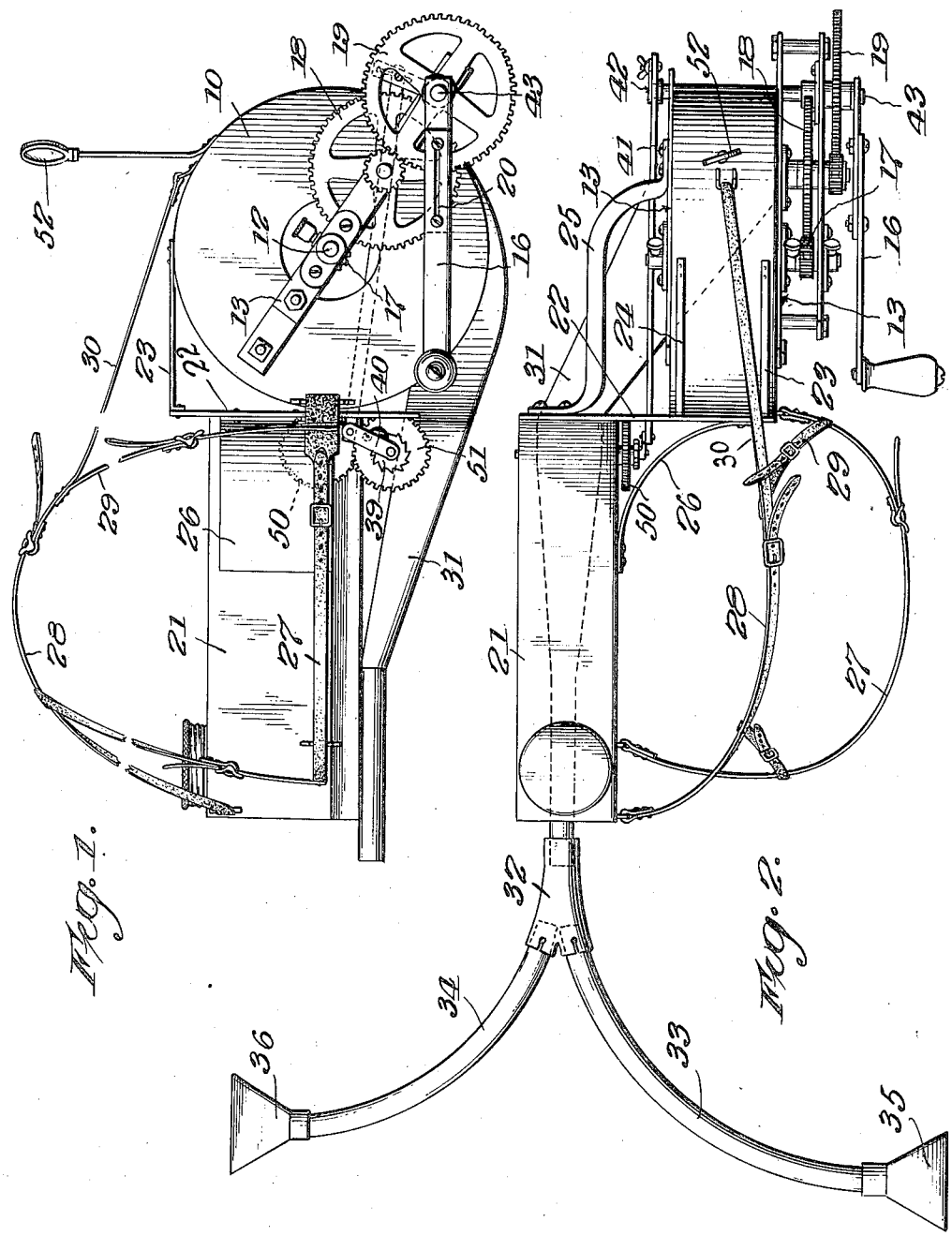

1,373,318.

Patented Mar. 29, 1921.
2 SHEETS—SHEET 2.

INVENTOR.
Daniel Gordon Edwards,
by Prentiss, Stone & Boyden,
ATTORNEYS.

UNITED STATES PATENT OFFICE.

DANIEL GORDON EDWARDS, OF HOPKINSVILLE, KENTUCKY.

POWDER-DISTRIBUTER.

1,373,318.          Specification of Letters Patent.          Patented Mar. 29, 1921.

Application filed February 11, 1920. Serial No. 357,792.

*To all whom it may concern:*

Be it known that I, DANIEL GORDON EDWARDS, a citizen of the United States, residing at Hopkinsville, in the county of Christian and State of Kentucky, have invented certain new and useful Improvements in Powder-Distributers, of which the following is a specification.

My invention relates to the destruction of insects, scales, fungi and other parasites which are injurious to plants, vines and other vegetation which are subject to the ravages of such pests and blights. In particular, the invention contemplates the provision of an efficient and convenient apparatus by means of which powdered insecticides or poisons may rapidly and easily be applied to the plants, vines, etc., by an operator walking between the rows.

The principal objects of the invention are to enable the operator walking between the rows of plants, etc., and to whose body the apparatus is secured, to efficiently distribute the powder on one or more rows with a minimum danger of having breathed the poisons distributed; to reduce as much as possible the expenditure of power by reason of change in direction of the blast; to improve the delivery of the powder from the powder box to the blower blast; and to the operator to inspect at all times the delivery of powder to the rear without turning around and without having his vision withdrawn from his path in advance.

The invention consists in the novel construction and arrangement of parts of a powder distributing machine hereinafter described and claimed and illustrated in the accompanying drawings, in which—

Figure 1 is a side elevation of the machine complete;

Fig. 2 is a plan view of the same;

Figure 3:
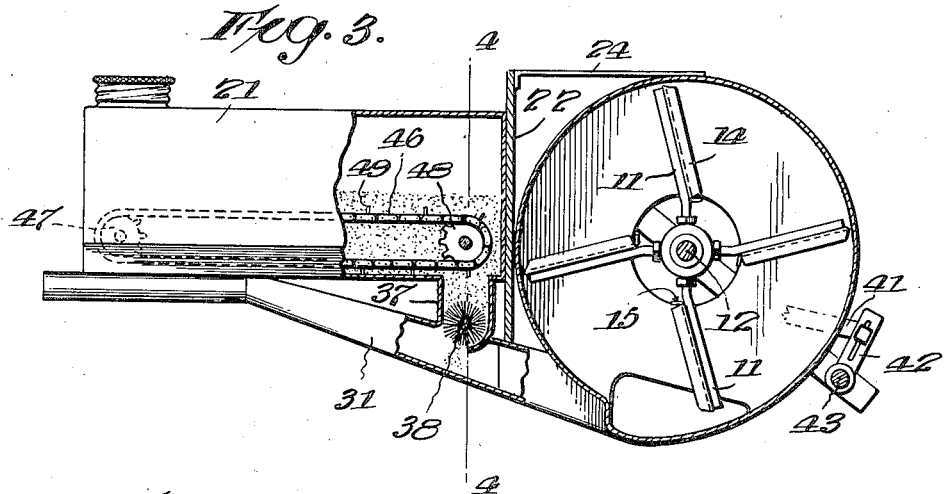
Fig. 3 is a side elevation showing the blower casing in vertical section, a portion of one wall of the powder supply box being broken away to show the agitator and feed devices.
Figure 4:
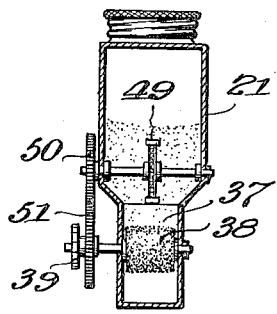
Fig. 4 is a cross section taken on line 4—4 of Fig. 3.

Referring to the drawings, in which like reference characters indicate the same parts throughout the several figures, 10 indicates a blower casing containing a rotary blower having blades 11 suitably mounted upon shaft 12, the latter working in bearings mounted upon strips 13 upon either side of said casing.

The blower may be of any desired construction, but is shown as comprising side flanges 14 for the blades with a crossed flange 15 at the inner edge, as fully described in my pending application Serial No. 354,811 filed January 29, 1920. The blower is driven by hand crank 16 through a train of gears 17, 18 and 19, the hand crank being adjustable by means of a slot and set screw connection 20 in order to vary the stroke of the crank.

The blower is arranged to deliver its blast rearwardly, with respect to the operator, and is mounted so as to be carried directly in front of the operator. For this purpose the blower casing is combined with the powder supply box 21 by positioning the latter in an offset relation to the crank casing rearwardly and to one side thereof, the blower casing and the powder supply box being connected into a unitary structure by means of suitable frame work. This frame work comprises a vertical plate 22, to the forward face of which the blower casing is secured as by means of braces 23 and 24 secured to the upper portion thereof and 25 secured to the side wall of the blower casing and to the forward face of the plate 22. The powder supply box 21 is secured to the rearward face of plate 22 in any suitable manner, and is braced by a curved plate 26, which constitutes also a body plate for the operator.

The structure, as thus constituted and braced, is adapted to be secured to the body of the operator by means of straps 27, 28 and 29, strap 30 extending forward to assist in supporting the blower casing.

The blower casing delivers rearwardly through conduit 31 from the lower portion of the blower casing, this conduit extending obliquely to the rear and passing under the powder supply box 21 to which it may be suitably secured. This conduit preferably tapers gradually toward its delivery end, which latter is provided with a delivery tube connection 32 which in this instance is shown as constructed to receive delivery tubes 33 and 34, each provided with a suitable nozzle 35, 36.

Figure 5:
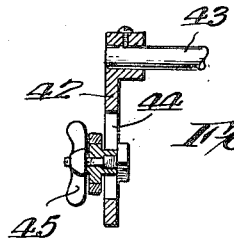
Fig. 5 is an enlarged detail view of the actuating connection for the powder feeding devices.

Powder from the powder supply box 21 is delivered to the blast from the blower through duct 37, which extends downwardly from one end of box 21, preferably the forward end, and into the conduit 31. The feed of the powder from the conduit 27 is effected by rotary brush 38 operated by a ratchet device 39, which is itself actuated through lever 40, arm 41 and lever 42, the latter being mounted to revolve with crank shaft 43. The throw of arm 41, and hence the degree of actuation of ratchet 39 is determined by the position of the end of arm 41 upon arm 42, which position may be shifted along the latter arm as shown in Figs. 1 and 5. This variable connection is shown as a slot 44 and set screw 45, the degree of rotation of brush 38 for each revolution of the crank shaft, therefore, varying the amount of powder fed to the blower blast.

In order to properly supply a continuous amount of powder to the feeding device, the powder supply box is provided with an agitator extending along the lower portion thereof, and arranged not only to agitate the powder within the box, but to carry the powder along the lower portion of the box and deliver it to the feed duct. This is effected by means of a conveyer belt 46, shown as a sprocket chain mounted upon sprocket wheels 47, 48, and carrying conveyer members 49 arranged at proper intervals. The sprocket chain is preferably arranged in a vertical plane, so that the conveyer members move along the bottom of the box and over the upper end of the feed duct 37. In order to actuate the sprocket chain, one of the sprockets as 48 is geared by means of gear 50 to some part of the drive mechanism, for instance a gear 51 mounted upon the spindle of ratchet device 39. The revolution of ratchet device 39 and gear 51, therefore, will cause the lower side of sprocket chain to travel forwardly toward delivery duct 37.

Inasmuch as the delivery of the blast is past the body of the operator, and the discharge of powder at his rear, it is desirable that he should be able to observe the amount of poisonous dust being supplied to the plant, and this without distracting his attention from his line of advance. I, therefore, provide a mirror 52 suitably mounted upon some part of the machine in front of the operator, and positioned to give the desired view toward the rear.

The operation of the apparatus will be readily understood from the foregoing, but may be briefly described as follows:

The operator having secured the apparatus upon his person by means of straps 27, 28 and 29, and facing toward the right looking at Figs. 1 and 2, and powder box 21 being provided with a suitable amount of the desired kind of poisonous powder, such as Paris green, arsenate of lead, or calcium arsenate of lead, etc., the operator advances between the rows of plants or vines turning the crank at the proper speed to provide the proper amount of air blast through conduit 31, at the same time brush 38 being revolved step by step to feed the proper quantity of powder from duct 37 into conduit 31. At the same time the conveyer belt or sprocket chain 46 is keeping duct 37 always supplied with powder, and is agitating powder within the box to prevent compacting. It will be observed that delivery tubes 33 and 34 curve rearwardly and outwardly, so as to deliver the powder in opposite directions upon adjacent rows of plants simultaneously. If preferred, only one tube and nozzle may be employed at a time.

While I have described a specific embodiment of my invention, I wish it to be understood that changes may be made in details of construction, without departing from the invention, and such changes I aim to include within the scope of the appended claims.

What I claim, and desire to secure by Letters Patent of the United States, is:

1. The combination with a blower having a casing, of a powder supply box offset at one side and rearwardly thereof, connecting means for securing said blower casing and powder supply box together, a delivery conduit direct from said blower casing rearwardly past said powder supply box, and means for feeding powder from said box to be delivered by the action of said blower.

2. The combination with a blower having a casing, of a powder supply box offset at one side and rearwardly thereof, connecting means for securing said blower casing and powder supply box together, means for attaching this structure to the body of an operator positioned in said offset facing said blower casing, a delivery conduit direct from said blower casing rearwardly past said powder supply box, and means for feeding powder from said box to be delivered by the action of said blower.

3. The combination with a blower having a casing, of a powder supply box offset at one side and rearwardly thereof, connecting means for securing said blower casing and powder supply box together, a delivery conduit extending obliquely rearwardly and beneath said powder supply box, means for feeding powder from said box to said delivery conduit, and means for operating said blower.

4. The combination with a blower having a casing, of a powder supply box offset at one side and rearwardly thereof, connecting means for securing said blower casing and powder supply box together, a delivery conduit extending obliquely rearwardly and beneath said powder supply box, means for feeding powder from said box to said delivery conduit, means for operating said blower, and a connection from said blower operating means to actuate said powder feeding means.

5. The combination with a blower having a casing, of a powder supply box offset at one side and rearwardly thereof, connecting means for securing said blower casing and powder supply box together, a delivery conduit extending obliquely rearwardly and beneath said powder supply box, a downwardly extending duct from said powder supply box to said delivery conduit, a rotatable brush for feeding powder from said duct to said conduit and means for rotating said brush.

6. The combination with a blower having a casing, of a powder supply box offset at one side and rearwardly thereof, connecting means for securing said blower casing and powder supply box together, means for securing the structure thus formed to the body of an operator positioned in the offset of the parts, a delivery conduit direct from said blower casing rearwardly past said powder supply box, means for feeding powder from said box to be delivered by the action of said blower, and a mirror carried by the structure in front of the operator, to enable the latter to view the delivery of powder in his rear.

In testimony whereof I affix my signature.

DANIEL GORDON EDWARDS.